United States Patent [19]

Huang

[11] Patent Number: 5,063,664

[45] Date of Patent: Nov. 12, 1991

[54] PROCESS FOR MANUFACTURING WHEEL HUB

[76] Inventor: Jung-Yi Huang, 293 Pei Tun Road, Taichung, Taiwan

[21] Appl. No.: 513,799

[22] Filed: Apr. 24, 1990

[51] Int. Cl.$^5$ .............................................. B21K 1/40
[52] U.S. Cl. ................................. 29/894.361; 29/414
[58] Field of Search ...................... 29/894.36, 894.361, 29/894.362, 414; 301/105 B; 72/367

[56] References Cited

U.S. PATENT DOCUMENTS

| 378,414 | 2/1888 | Burkhardt | 72/367 |
|---|---|---|---|
| 1,383,486 | 7/1921 | Roberts | 29/894.362 |
| 1,840,941 | 1/1932 | Eksergian et al. | 29/894.361 |
| 3,457,762 | 7/1969 | DeGain | 72/367 |

FOREIGN PATENT DOCUMENTS

| 3406650 | 9/1985 | Fed. Rep. of Germany | 301/105 B |
|---|---|---|---|
| 459292 | 4/1920 | France | 72/367 |
| 2300686 | 9/1976 | France | 301/105 B |
| 4660 | of 1898 | United Kingdom | 301/105 B |
| 980598 | 1/1965 | United Kingdom | 301/105 B |

Primary Examiner—P. W. Echols

[57] ABSTRACT

A process for manufacturing wheel hub comprises an iron tube being swaged in wave form that can be cut to form a plurality of axle tubes; a plurality of bearing receiving bowls and a plurality of bowl holders. Each axle tube has a hub flange by stamping. Each hub flange has at its face plate a plurality of spoke holes and therein a bowl receiving recess. For the front wheel hub each bearing receiving bowl has at its bottom center an axial hole corresponding to the axial hole of the axle tube. In alignment with the axial hole of the bearing receiving bowl and the axial hole of the axle tube, the bearing receiving bowls are respectively provided for permitting to insert into the bowl receiving recesses and defining as a front wheel hub. For the rear wheel hub, the bowl holders have an inner surface, attaching to the outer portion of each bearing receiving bowl by brazing, being defined as a front portion. One of the bowl holders has a threaded portion on its front outer portion for permitting the connection of a free wheel. Each bowl holder has a rear outer surface, attaching to the front inner portion of each bowl receiving recess by brazing, being defined as a rear wheel hub.

2 Claims, 3 Drawing Sheets

PROCESS FOR MANUFACTURING WHEEL HUB

BACKGROUND OF THE PRESENT INVENTION

The present invention relates to a wheel hub; more particularly to provide a process for manufacturing a wheel hub for vehicles, such as bicycles.

Accordingly, the hubs are located at the front and rear wheel axles. When vehicle is in motion, all shocks and vibrations are transimitted to the frame through the hubs. Moreover, the motivating power to move the vehicle is transmitted as torque, pressure, extension and shear through to the drive wheel. Therefore, the hub is an extremely important component of a vehicle such as bicycle. Take a front hub as an example, please referring to FIG. 1.

The conventional hub 10 comprises an axle tube 11 and two hub flanges 12 which respectively include a bearing receiving bowl 13. The hollow cylindrical axle tube 11, has two axial opening ends. Each bearing receiving bowl 13 has a weld portion 131 adjacent to its axial hole which diameter subtantially equals to the diameter of both ends of the axle tube 11. And each hub flange 12 and bearing receiving bowl 13 is single piece constructed and formed by pressing. With the two axial holes of the two bearing receiving bowls 13 respective to both ends of the axle tube 11, both ends of the axle tube 11 are respectively connected with the weld portions 131 of the two hub flanges 12 and the two bearing receiving bowls 13 by welding. However, the disadvantages of the welding connection are:

1. the connected portion of the axle tube 11, the hub flange 12 and the bearing receiving bowl 13 will be split open, because the welded portion is so close to the concentric axis that the welded portion cannot resist the high torque;

2. welding costs too much in manufacturing;

3. the conventional hub flange 12 and bearing receiving bowl 13 need five steps of stamping, then make its axial hole;

4. although only the bearing receiving bowl 13 needs heat treatment, the conventional hub flange 12 and bearing receiving bowl 13 and the axle tube 11 are made of a single iron plate and manufactured by stamping press, they will have heat treatment together; therefore it raises the manufacturing cost again.

SUMMARY OF THE PRESENT INVENTION

The present invention is to provide a process for manufacturing a wheel hub which comprises a hollow cylindrical iron tube, being swaged to form an axle tube which both ends being respectively shaped as two hub flanges and two bearing receiving bowls by stamping.

Apart from avoiding the previously-mentioned disadvantages, the main object of the present invention is to lower the manufacturing cost, promote the quality and make the axis of the wheel hub highly concentric about its longitudinal axis.

DETAILED DESCRIPTION OF THE PREFERRED EMBODIMENT

Figure 1:
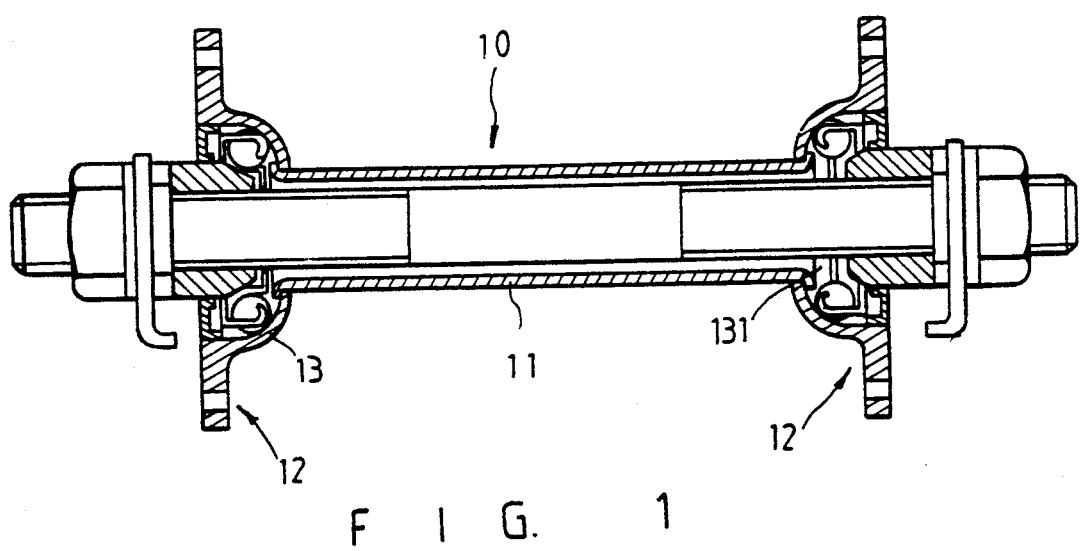
FIG. 1 is a cross-sectional view of a wheel hub according to the prior art.
Figure 2:
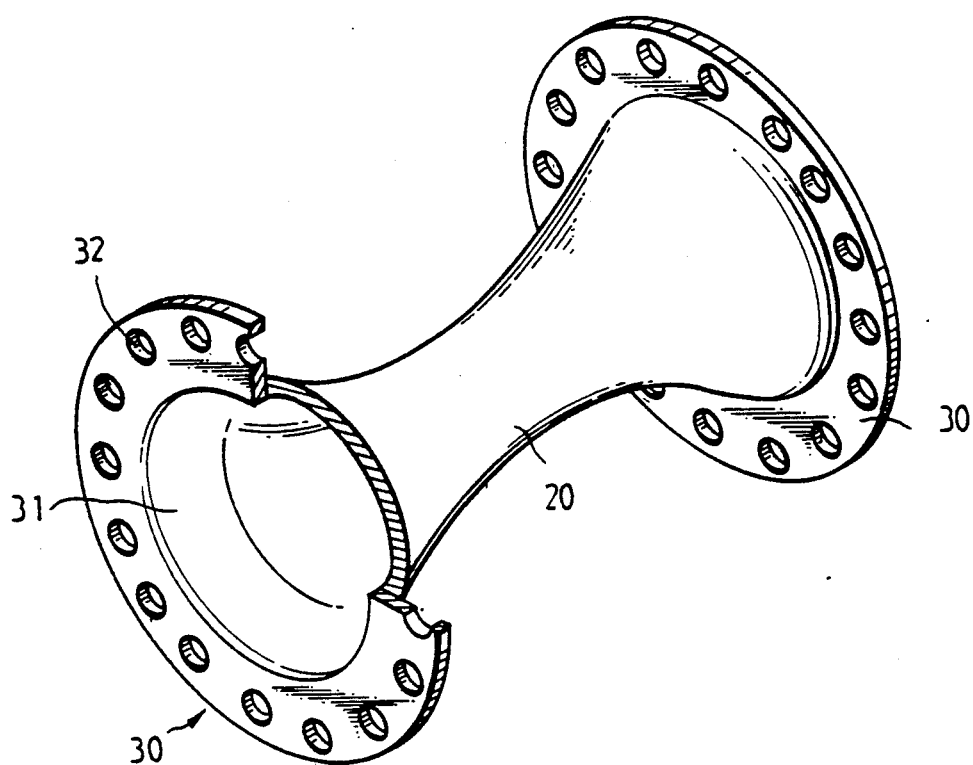
FIG. 2 is a perspective exposed view of the preferred embodiment of the present invention.
Figure 3A:
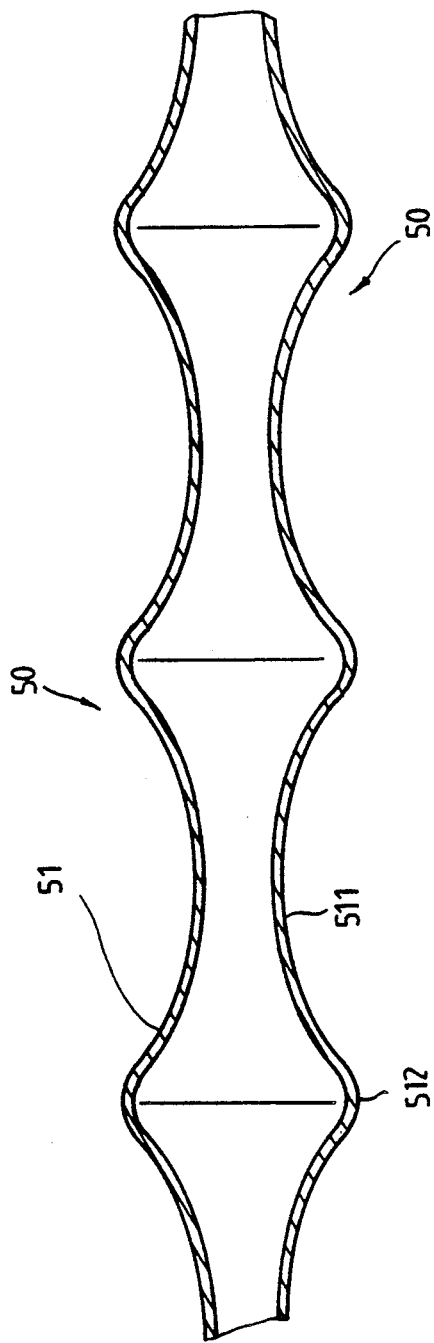
FIG. 3 is a cross-sectional view of different stages of manufacturing process for a front wheel hub according to the present invention.
Figure 3C:
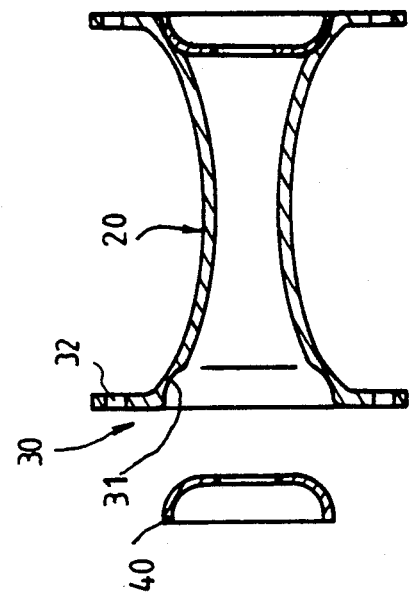
Figure 3B:
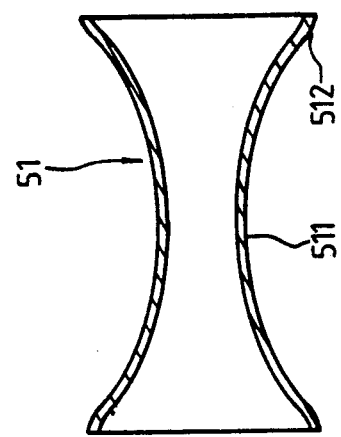

Referring to FIG. 3A FIG. 3B and FIG. 3C that illustrating, the process for manufacturing a wheel hub which comprises an axle tube and a plurality of bearing receiving bowls 40 and at least two bowl holders 41. A workpiece 50 comprises a plurality of half-finished axle tubes 51 being shaped from a hollow cylindrical iron tube by swaging to have a plurality of low wave portions 511 and high wave portions 512 in a predetermined distance on its upper and lower portions internally. The wave form of its upper portion is sequentially in a fixed frequency approximately longer than the longitudinal length of the axle tube to be manufactured. The wave form of its lower portion is opposite from the wave form of its upper portion.

Then cut the workpiece 50 as a plurality of single piece high-finished axle tubes 51 from the highest point of the half wave portion 512 to the lowest point of the low wave form. As shown in FIG. 3B, each partially finished axle tube 51 has a low wave portion 511 around its middle and two half high wave portions 512 flaring at its both ends. So, both ends of the half-finished axle tube 51 are respectively and approximately in a trumpet shape.

Referring to FIG. 3C, both half high wave portions 512 are respectively formed as two hub flanges 30 by stamping. Each hub flange 30 has a bowl receiving recess 31 at its annular portion and a plurality of spoke holes 32 at its face plate. The whole half-finished axle tube 51 is defined as an axle tube 20. Two bearing receiving bowls 40 each has an axial hole in its center. The axial holes of the bearing receiving bowls 40 are respectively corresponding to the axial hole of the bowl receiving recesses 31 and defined as the rear portions of the bearing receiving recesses 31. The diameter of the inner front portion of each bowl receiving recess 31 is slightly smaller than the diameter of the outer rear portion of each bearing receiving bowl 40 for permitting the two bearing receiving bowls 40 to be respectively pressed to firmly insert into the two bowl receiving recesses 31. Therefore the only two bearing receiving bowls 40 need heat treatment in the present invention.

Thus the front wheel hub is completed, after two bearing receiving bowls 40 formed by stamping are respectively inserted into the two bowl receiving recesses 31 as shown in FIG. 3. The insertion is proceeded by respectively pressing the two bearing receiving bowls 40 into the two bowl receiving recesses 31 on a die. Thus, the present invention only needs three steps in the manufacturing process.

Figure 4:
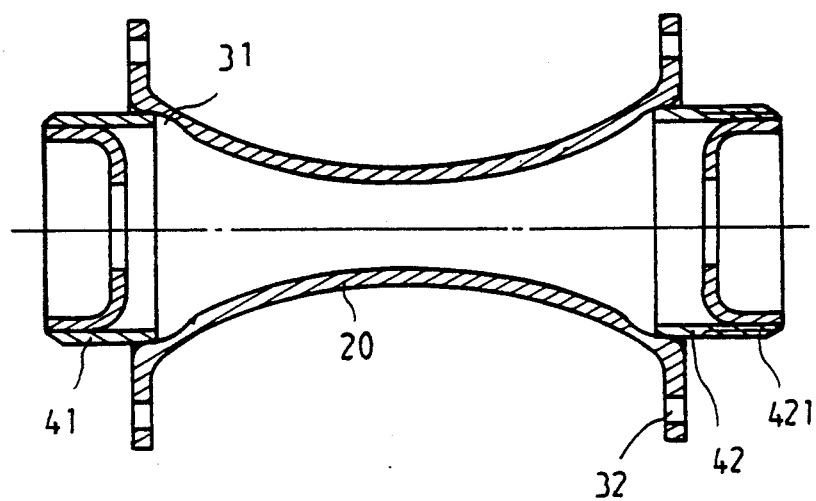
FIG. 4 is a cross-sectional view of a rear wheel hub according to the present invention.

As to the manufacturing process of the rear wheel hub is, as shown in FIG. 4, to respectively fasten the front inner surfaces of the two bowl holders 41 and 42 to both outer surfaces of the bearing receiving bowls 40 by brazing. On the front outer surface of the bowl holder 42, threads 421 are provided for connecting to a free wheel. And respectively connect the rear outer surfaces of the two bowl holders 41 with both inner portions of the bowl receiving recesses 31 by brazing. Then again, the rear wheel hub is completed. There is no need to produce rear bearing receiving bowls by another manufacturing process.

I claim:

1. A process for manufacturing a wheel hub comprising an axle tube and a plurality of bearing receiving bowls, comprising the steps of:

making a hollow cylindrical iron tube to form a plurality of partially finished axle tubes that are shaped to have a plurality of small wave portions and large wave portions in a predetermined distance on the upper and lower portion of said iron tube intervally by swaging; wherein, the wave form of said upper portion of said iron tube being sequentially in a fixed frequency and in a distance slightly longer than the longitudinal length of said axle tube, while the wave form of said lower portion of said iron tube being opposite from the wave form of said upper portion of said iron tube; then cutting said iron tube as a plurality of single piece partially finished axle tubes from the highest point of said upper portion to the lowest point of the wave form of said lower wave portion; therefore, each said partially finished axle tube having a small wave portion around its middle and two large wave portions flaring at its both ends in a trumpet shape;

stamping said both large wave portions to form two hub flanges respectively; each said hub flange having a bowl receiving recess at its annular portion and a face plate with a plurality of spoke holes formed; thus said axle tube is completely formed;

pressing two bearing receiving bowls stamped to form said bearing receiving bowls in a bowl shape to provide an axle hole in the bottom center to insert into said two bowl receiving recesses respectively such that said axle holes of the bearing receiving bowls being aligned with the axis of said bowl receiving recesses and defined as the rear portions of said bearing receiving recesses; wherein the diameter of the inner front portion of each said bowl receiving recess being slightly smaller than the diameter of the outer rear portion of each said bearing receiving bowl for permitting said two bearing receiving bowls to be respectively pressed into said two bowl receiving recesses firmly together and defining a front wheel hub.

2. A process for manufacturing a wheel hub comprising an axle tube and a plurality of bearing receiving bowls, comprising the steps of:

making a hollow cylindrical iron tube to form a plurality of partially finished axle tubes that are shaped to have a plurality of small wave portions and large wave portions in a predetermined distance on the upper and lower portion of said iron tube intervally by swaging; wherein, the wave form of said upper portion of said iron tube being sequentially in a fixed frequency and in a distance slightly longer than the longitudinal length of said axle tube, while the wave form of said lower portion of said iron tube being opposite from the wave form of said upper portion of said iron tube; then cutting said iron tube as a plurality of single piece partially finished axle tubes from the highest point of said upper portion to the lowest point of the wave form of said lower wave portion; therefore, each said partially finished axle tube having a small wave portion around its middle and two large wave portions flaring at its both ends being in a trumpet shape;

stamping said both large wave portions to form two hub flanges respectively; each said hub flange having a bowl receiving recess at its annular portion and a face plate with a plurality of spoke holes formed; thus, said whole partially finished axle tube being defined as an axle tube;

pressing two bearing receiving bowls stamped to form said bearing receiving bowls in a bowl shape and to provide an axle hole in the bottom center to insert into said two bowl receiving recesses respectively that said axle holes of the bearing receiving bowls correspond to the axis of said bowl receiving recesses and defined as the rear portions of said bearing receiving recesses; wherein the diameter of the inner front portion of each said bowl receiving recess being slightly smaller than the diameter of the outer rear portion of each said bearing receiving bowl for permitting said two bearing receiving bowls to be respectively pressed into said two bowl receiving recesses firmly together and defining a front wheel hub;

fastening the front inner surface of two bowl holders, one of said bowl holders having threads on its front outer surface, by brazing to the outer surfaces of two bearing receiving bowls stamped to form a bowl shape respectively then, connecting the rear outer surfaces of said two bowl holders respectively with the inner portions of said bowl receiving recesses by brazing and defining a rear wheel hub.

* * * * *